June 10, 1952 M. D. BERGAN 2,600,371
CABLE CONNECTOR
Filed July 14, 1949
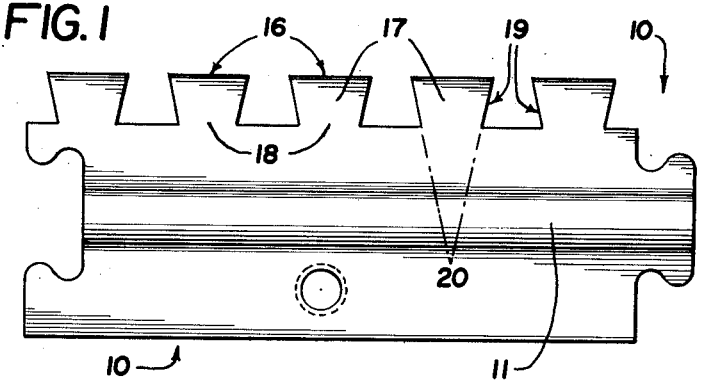
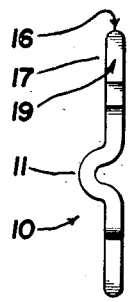
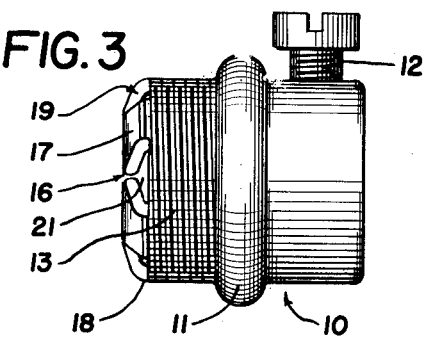
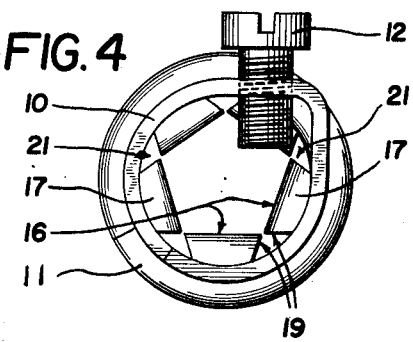
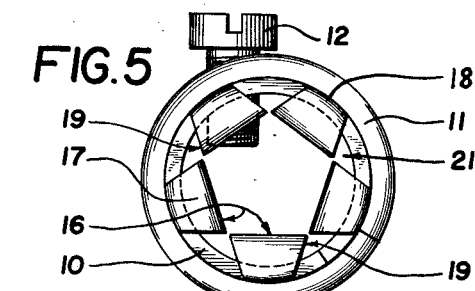
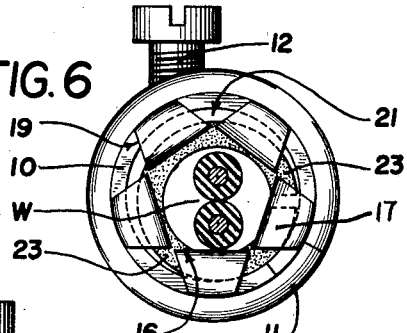
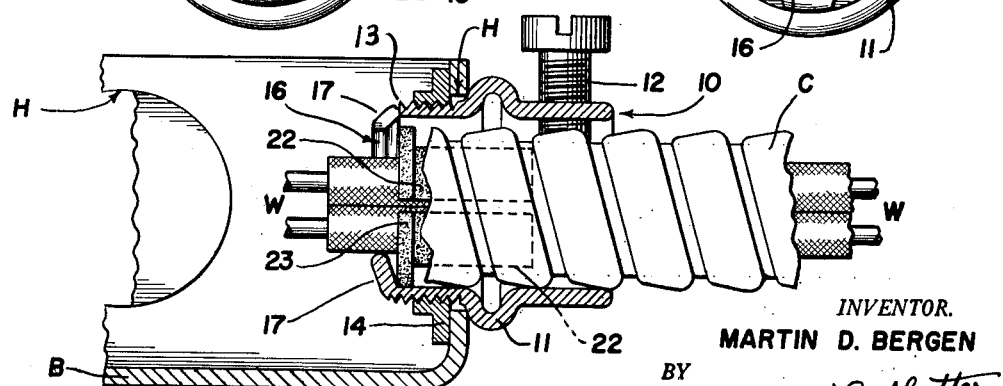
INVENTOR.
MARTIN D. BERGEN
BY James C. Ledbetter
ATTORNEY.

Patented June 10, 1952

2,600,371

UNITED STATES PATENT OFFICE 2,600,371

CABLE CONNECTOR

Martin D. Bergan, Westfield, N. J., assignor to The Thomas & Betts Co., Elizabeth, N. J., a corporation of New Jersey Application July 14, 1949, Serial No. 104,679

1 Claim. (Cl. 285—6.5)

This invention relates to a new and useful cable connector for fitting together and assembling electrical raceway systems which enclose and protect insulated conductors comprising the wiring of light and power circuits.

Fittings of the type under consideration are not electrical connectors; they are non-conductive mechanical-joint-forming devices, constituting a part of the protective conduited raceway system, and are insulated from the wiring per se enclosed within the conduits.

Cable connectors of the type herein improved are used for joining conduit—more particularly flexible-metallic conduit, as well as BX cable kindred thereto—with raceway boxes in general. This type of conduit comprises a flexible-metallic spiral-armor sheath which encloses and protects the insulated conductors constituting the electrical circuit wiring within the armored raceway.

The invention provides improvements at the juncture of the conduit and box, a critical point in the raceway, where the conductors enter the box through the non-conductive connector, and at which point the likely hazard of a "short circuit" and resulting "fire" is accentuated in electrical wiring systems. Thus the junction of the conduit with the box constitutes one of the more important stations for examination and approval by a wiring inspector before the electric current is "switched on" for the first time in a newly installed raceway and wiring. The problem of permanently insulating the "live" wiring is all the greater due to the proximity of the metallic raceway, the number of parts involved, the limited space in which said parts are cramped, and the likelihood of a workman damaging the insulation when manipulating the wiring against the metal parts.

In electrical raceway systems employing spiral-armor conduiting, as herein treated, it is or should be required that the installation be visible for inspection where the insulated wiring emerges from the conduit, extends through the connector, and through the lock nut thereof, thus entering the box, that is, at the juncture-assembly of the latter "four members" and also a critical "fifth" later named. It is known practice to provide various forms of inspection apertures or view-openings (commonly known as "peep-holes"), formed in the front or inner end of the connector, as a means of making visible the critical part or parts where the wiring enters the box.

The front open end of a spiral-armor cable connector is restricted by an internal throated annulus known as a "bushing-stop." Such bushing contains the view-openings and extends into the conduit box where the light may be poor. A wiring inspector frequently uses a flashlight when examining the connector and related parts assembled within the usual knockout opening of the box. This invention provides improvements concerning said bushing-end of the connector, making for greater assurance, as to the completeness of the installation, at and in the knockout opening of the box—for it is here that the critical juncture-assembly of the parts (usually "five" in number) is made—and where the "peep-hole" type of bushing performs three important functions.

Conventional cable connectors do not always provide adequate inspection apertures (peep-holes) in aid of examination of the electrical wiring emerging from the conduit, through the connector, and into the box. This is somewhat of a problem in view of the fact that the installed connector may have been oriented by the workman one way or another within the knockout opening of the box. Thus it may occur that the ordinary peep-holes, as in conventional practice, may sometimes be located towards the inner side or far wall of a box (away from the eye of the inspector) where the light does not readily illuminate that part of the installation to be examined and approved before turning on the current in a new wiring system.

Further as to this problem, many present-day connectors have an insufficient number of inspection apertures (which are of small size and thus inadequate in area of visibility), with the result that an inspector of raceway wiring may experience difficulty (when working at close quarters) in determining whether or not the workman has fully complied with requirements governing the installation and the fixing of all related parts in place within the juncture-assembly at the knockout opening in the box.

On the other hand, such present-day connectors as may have adequate size inspection apertures, to thereby afford good visibility, achieve the latter by compromising the function of what is known as the "bushing-throat" at the front end of the connector within the box, as by reducing the annular area of the "bushing-stop" to increase inspection visibility. But that expediency compromises the full-throated entry-guide so essential for the prevention of wear and tear (abrasion) on the insulation of the wiring emerging from the raceway into the box and is unsatisfactory in itself, even though the "stop" of the bushing may not be impaired in function.

Accordingly, this invention is devoted to solving the problem posed by the "bushing" (its throat and stop) at the front end of a raceway connector, that is, the species of connector employed with spiral-armor flexible conduit—for it is the latter type of conduit which gives rise to the "visible inspection" requirements best and more fully understood by next naming the "fifth member" as the final part in the knockout juncture-assembly at and in the raceway, as heretofore mentioned.

In making wiring installations safe, it is now the practice to use what is known as an "anti-short insulating thimble or liner" (the fifth member) which, in itself, is a "fiber bushing" but is referred to herein as the "anti-short liner" for clarity and in order to contrast and distinguish it from the "metallic bushing" embodying the new "throat" and "stop" of the invention herein.

The conventional anti-short insulating liner is made of colored fiber or the like, usually "red" for conspicuousness. It is or should be inserted in the end of the raceway conduit (used only in flexible-metallic conduit and BX cable) in a position to embrace the insulated electrical conductor. Thus, the red anti-short liner is an extra and further member, which augments and reinforces the wiring insulation per se, additionally to protect the insulation from being damaged by rupture or abrasion against the rough and jagged or burred cut-off end of the conduit from which the wiring emerges, thence through the "bushing-throat" of the cable connector, and then into the box.

The anti-short liner is of red-colored fiber to enhance its visibility, not only to aid the wiring inspector subsequently to see it in place, but it is also "red" as an additional urge and tell-tale upon the workman to install it at the time he cuts a required length of spiral-armor from his supply roll to make the raceway run on which he is working. The anti-short liner is small in size, frequently tedious to squeeze into an annulus around the conductors between the spiral-armor at the jagged cut-end of the latter, and its use is essential. It is the one part which a workman sometimes may overlook and not include in the wiring assembly.

The foregoing only briefly points out some of the problems in which spiral-armor raceway connectors are involved, but the other problems thereof will be understood by those conversant with the art—in particular those factors concerning the "bushing-throat" of connectors, the manufacture, installation, and utility thereof, also their ability to maintain an enduring juncture-assembly which is permanently insulated from the electrical wiring against "short circuiting" hazards in its many unpredictable forms. Accordingly, I come to a description of my invention and the simplicity of its application to the problem.

It may be said, among other things, that it is a purpose of this invention to improve the front or inner-end construction of cable connectors, that is, the inspection apertured type of "throated" bushing "stop" formed on the tubular body of connectors. In purpose and accomplishment, this new raceway connector not only is provided with a maximum number of maximum size inspection or peep holes through its bushing-stop in order to expedite the examination and approval of the electrical wiring when installed, but moreover has a bushing-throat which prevents or reduces abrasion and wear of the wiring insulation during the work and thereafter throughout the life of the raceway installation.

In other words, a purpose is to produce a "bushing-stop" (for cable connectors) which is characterized by a maximum area of inspection apertures comprising open-work peep-holes of large number and large size, in combination with a "bushing-throat" having a complete and uninterrupted internal throated perimeter, with a rounded and smooth or oval-edge, through and against which the insulated electrical wiring may be manipulated during the work and thereafter remain at rest with a minimum of or no wear and tear thereon.

Thus in purpose, the invention seeks to impress two improvements upon the common bushing by reforming both the "stop" and the "throat" thereof, to render such bushing new in structure, enhance its utility, and rectify its long-standing faults.

The accompanying drawings with description and claim explain the invention as preferred and embodied at this time for an understanding of the problems sought to be solved. Since the teachings herein may suggest structural changes to others who wish to avail themselves of these benefits, it is pointed out that subsequent modifications of the invention may well be the same in spirit and principle as this original disclosure.

The original Patent Office drawings, constituting a part hereof, are made to twice scale and from a "3/8 trade size" commercial production specimen of the cable connector. Thus, the official drawings show the connector to scale from which not only the proportions but the actual dimensions are available as a part of this disclosure.

Fig. 1 is a plan view of a punched or blanked sheet-metal stamping from which the cable connector may be made, one preferred material being cold-rolled bright-sheet steel having a rounded-longitudinal edge.

Fig. 2 is an end-edge view of the stamping which emphasizes the round or ovaled-smooth edge along one of its long parallel sides.

Fig. 3 is a side elevation of the finished connector, its front end being at the left, and embodying the new peep-hole bushing of this invention.

Fig. 4 is a view of the rear or outer open end of the connector looking toward its new front-end bushing-throat.

Fig. 5 is a front end view looking directly into the new bushing, the throat of which provides a smooth-entry passage where the insulated wiring is adapted to extend outward from the connector, and the large area apertures afford good inspection visibility, while the stock of the bushing (its lip later explained) provides an adequate stop or rest for the end of the spiral-armor BX cable.

Fig. 6 also is a front end view, thus the same as Fig. 5, except showing a BX cable in place, with an anti-short insulating liner also in place on the electrical conductors, the liner being "stippled" to indicate its red color, and plainly visible by reason of the generous area of inspection apertures visibly exposing the red liner behind the bushing.

It is observed that the two front end views (Figs. 5 and 6) are comparison illustrations, the former showing the connector only, while the latter view shows it assembled with the armored electrical wiring in readiness for anchorage in a conduit box.

Fig. 7 shows a sectional view of the new connector fitted into a knockout opening of the box, thus assembling therein the spiral-armor enclosing the electrical wiring, together with the anti-short liner. This liner embraces and reinforces the conductor insulation at the first critical or danger point where the wiring emerges from the jagged and burred end of the armor. And the second critical point is accommodated by the new bushing-throat where the wiring emerges from the connector into the box.

The latter view is conventional of a box and spiral-armor (BX cable) juncture-assembly, except for the new bushing per se introduced by the first six views of the drawing. The two assembly views (Figs. 6 and 7) demonstrate the utility of the invention by emphasizing important functional advantages of the novel bushing, among other things—first, its full-throated smooth-edge formation increases protection against wear, tear and abrasion of the insulation of the "live" electrical wiring proximate the metal parts and—second, its generously perforated annulus enlarges the inspection area as a more certain means of revealing that the anti-short liner is in place to insure said "live" wiring.

Referring further to the drawings, it is observed that the same part numbers are applied to the flat sheet-metal blank stamping as to the finished tubular connector. Thus, a die-formed blank 10 (Figs. 1 and 2) is rolled-up to produce a tubular body 10 (Figs. 3, etc.). The ends of the machine-curled blank are permanently joined by an interlocked notch and tongue which may be seam-brazed or permanently secured by other known means. An external annular box-engaging shoulder 11 is formed on the tubular body, and a cable-fastening set screw 12 is mounted in the rear end of the body. Also, its front end portion is screw-threaded as at 13, and a box-lock nut 14 is screwed thereon (Fig. 7) in the usual manner.

The foregoing paragraph briefly presents a structural outline of a known type of spiral-armor cable connector per se, hence without covering my novel bushing herein. The latter is introduced by first describing one exemplary method of manufacture of the connector, by which to embody the bushing therein, which is formed integrally, as an improved annulus, at the front end of the screw-threaded portion 13 of the tubular body.

In the method of producing the connector, the flat strip material for die-forming the blank 10 has one of its longitudinal parallel side edges ovaled to a smooth semi-circular finish, thereby providing a rounded straight edge 16 which is of importance.

The flat stamping 10 (Figs. 1 and 2) is die-cut at its rounded long edge 16 to form a plurality of lips 17 of trapezoidal form. This is accomplished by shearing away equal-size and equally-spaced segments of trapezoidal shape, thus leaving the segmental lips 17 symmetrically aligned along the one parallel ovaled edge 16 of the sheet-metal stamping 10. These lips 17 constitute bushing-forming portions on the flat stamping 10. Good results are obtained with five lips 17 of the size and spacing shown. A greater and also a lesser number have been tried, with the result that the five-lip formation is proposed as one of the preferred embodiments of the invention for manufacture of the ⅜ trade size connector here illustrated.

In die-cutting the several bushing-forming lips 17 to the shape of trapezoids, the longer side edges 16 of such geometrical shapes are formed from said long rounded edge of the stamping 10. Purposefully, the outer rounded edge 16 of each lip 17 is longer than each inner parallel base portion 18 which remains integral with the stamping 10. The parallel inner and outer lip sides 16 and 18 are joined by non-parallel side edges 19, the angles of which are observed to intersect within the body of the flat stamping 10, as at 20 therein or approximately so, being the vertex of the two side edges of any one and all of the trapezoidal bushing-forming lips 17 of symmetrical form.

The lips 17 are die-pressed or bent inward toward the center or longitudinal axis of the tubular body 10 (Fig. 3, etc.) until the two ends of each rounded edge 16 come into contiguous annular relation. Thus, the two outer corners (being the ends of each rounded edge 16) close in with each other, as by engaging or by leaving such a minute spacing therebetween that the surface continuity of the smooth and ovaled half-round edge of the polygonally-shaped throat 16 is not broken or interrupted. The close meeting of the inwardly-folded lips 17 (the corner points thereof) produces a full-throated bushing-perimeter 16, within the circumference of and coaxially with the tubular body, in the form of an internal perforated annulus, which restricts the front end opening of the tubular body 10.

Significantly, the two sharp outer corners, at the end of each and every half-round or ovaled-edge 16, are the result of the particular geometrical shape, which I discovered for the bushing lips 17, in order to achieve several functional improvements herein. However, the sharp end corners are masked in the finished connector by aligning them into the segmental annulus 17 and thereby insuring them against engagement with the wiring insulation. In die-forming and processing the stamping 10 (Figs. 1 and 2), the said sharp end corners are closed within the plane of the bushing-throat perimeter 16, form a part thereof, mask each other from protrusion beyond the throat perimeter, seal off the machine-punched edges 19 lacking smoothness and likely having shear burrs thereon, and also define the inner vertices of large size inspection apertures 21 ordinarily known as peep-holes.

Next, it is observed that said peep-holes 21 are novel in their triangular form—a geometrical shape which I have devised as one of the best to provide a generous open inspection area coextensive with the bushing annulus. One side of each triangular shaped peep-hole 21 is formed at the circumference of the tubular body 10, and the apex of each triangle is in the throat perimeter 16.

The new structural combination of geometrical shapes (trapezoidal for the bushing-forming lips 17 and triangular for the bushing peep-holes 21) accomplishes several aims—that of providing adequate stock material within the lips 17 for strength in order not to impair their function as a "stop" for the end of a cable adapted to be inserted into the connector—that of providing a generous open-work "peep-hole" area to facilitate visible inspection—and that of providing an unbroken continuity of the rounded edge "bushing-throat" 16 as a smooth-finish guide and rest against which the wiring can be manipulated without impairing its insulation.

In describing the use of the foregoing spiral-armor cable connector with its novel bushing 17, reference is made to Figs. 6 and 7 illustrating standard practice. There is shown a conduit box B, with its knockout opening or hole H, in which the juncture-assembly of the conduit and box is made, being a critical part of an electrical raceway installation, as heretofore stated.

It is observed that the end of a spiral-armor cable C is mounted in the rear open end of the connector body 10, pushed into final position against the stop-bushing 17, with the electrical wiring W extending through the bushing-throat 16 at the front end, and into the box B, the cable armor being fastened in the connector by tightening the set screw 12. Then the lock nut 14 is tightened against the inner wall of the box, thus gripping the annular shoulder 11 of the connector against the outside of the box wall, and assembling all parts in the knockout hole H.

The spiral-armor conduiting C has its rough-cut end fitted as usual by the workman on the job with an anti-short liner (stippled for color "red" in Figs. 6 and 7) which is split lengthwise to facilitate its insertion. This liner comprises a fiber sleeve 22 forming its body which is crowded into the tubular end of the armor and around the wiring W insulation to reinforce it, with an integral fiber flange 23 forming its head which is either held close to or against the rough armor end to mask it. Accordingly, the anti-short liner (its end flange 23) forms an insulating barrier between the "live" wiring and the end of the armor, said end of the latter (being the liner flange 23) resting snugly against the peep-hole bushing-stop 17. The red flange 23 is now plainly visible; it stands out to the eye—appearing as a circle of triangularly-shaped red-spots at 21.

The insulated electrical "live" wiring W now safely extends outward from the rough-burred end of the spiral-armor C, forward through the anti-short insulating safety liner sleeve 22 and its red flange 23, rests upon and extends through the bushing-throat 16, and thence emerges into the raceway box B. The liner insures the wiring W insulation from pricking and abrading engagement with the rough metal end of the armor. Also, the rounded-edge smooth-continuity of the metal bushing-throat perimeter 16 insures against pricking and wearing the insulation when pulling and manipulating the wiring in the box while making the initial installation and, subsequently, when handling and bending the wiring for making outlet or service connections.

From the foregoing, it is manifest that the generous open-work peep-hole area 21 of my new bushing-stop 17 makes for clear visibility of the anti-short safety bushing liner—the flanged red-head 23 thereof. A workman may not indifferently omit the red liner, since my new connector immediately and more fully exposes his oversight, whereupon a wiring inspector will disapprove this part of the raceway electrical wiring installation.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful cable connector. Since various modifications in construction, mode of operation, use and method, may and often do occur to others, especially so after acquaintance with an invention, it is to be understood that this disclosure is exemplary of the principles and of equivalent constructions, without being limited to the present showing of the invention.

What is claimed is:

A cable connector comprising a tubular body open at its rear end, adapted to receive a conduit enclosing insulated electrical wiring, and having means to secure the conduit and body within a box hole, the front end of the tubular body being deformed symmetrically and annularly inward toward its longitudinal axis; the deformed end constituting a bushing-stop as a seat for the end of the conduit, and also constituting a bushing-throat restricting the open front end of the tubular body, and through which the insulated wiring extends; the bushing-stop being provided with a plurality of peep-holes equidistantly spaced and symmetrically formed therearound and opening into the front end of the tubular body, through which visible inspection may be made of the electrical wiring; the peep-holes being triangular shaped, with an apex of each triangular peep-hole located at the inner perimeter of the restricted bushing-throat, and one side of each triangular peep-hole being formed along the circumference of the tubular body; and thereby providing a maximum size for each of a maximum number of said peep-holes, through the bushing-stop, without interrupting the continuity of the inner perimeter of the bushing-throat, by which to provide maximum area for said visible inspection.

MARTIN D. BERGAN.

REFERENCES CITED

The following references are of record in the file of this patent:

UNITED STATES PATENTS

| Number | Name | Date |
|---|---|---|
| 1,801,549 | Frederickson | Apr. 21, 1931 |
| 2,485,676 | Thomas | Oct. 25, 1931 |
| 2,490,253 | Buchanan | Dec. 6, 1949 |